United States Patent [19]

Holland

[11] 4,227,075
[45] Oct. 7, 1980

[54] MULTICHANNEL FIBER OPTIC CONTROL SYSTEM

[75] Inventor: John M. Holland, Shawsville, Va.

[73] Assignee: International Telephone and Telegraph Corporation, New York, N.Y.

[21] Appl. No.: 829,168

[22] Filed: Aug. 30, 1977

[51] Int. Cl.$^2$ .............................................. H04B 9/00
[52] U.S. Cl. ......................................... 370/4; 455/612
[58] Field of Search ....................... 325/492, 152, 186; 250/199; 340/146 AG

[56] References Cited

U.S. PATENT DOCUMENTS

| | | | |
|---|---|---|---|
| 3,147,460 | 9/1964 | Scott | 340/146.1 AG |
| 3,340,505 | 9/1967 | Scott | 340/146.1 AG |
| 3,350,713 | 10/1967 | Laurent | 325/186 |
| 3,597,684 | 8/1971 | Damen | 250/199 |
| 3,691,388 | 9/1972 | Patel | 250/199 |
| 3,710,122 | 1/1973 | Burcher et al. | 250/199 |
| 4,070,572 | 1/1978 | Summerhayes | 250/199 |

OTHER PUBLICATIONS

Konnerth et al., Optical Transmission Utilizing Injection Light Sources, IEEE Spectrum, Sep. 1970, vol. 7 #9, pp. 37-45.
Guide to Standard MOS Products-American Microsystems Inc., May 1975, pp. (7-3)-(7-8).
Kudo-New Fiber Cable Transmission Systems Using LED Semiconductor Laser as Optical Source, JEE, No. 115, pp. 42-46, Jul. 1976.

*Primary Examiner*—Benedict V. Safourek
*Assistant Examiner*—Joseph A. Orsino, Jr.
*Attorney, Agent, or Firm*—John T. O'Halloran; Peter C. Van Der Sluys

[57] ABSTRACT

A control system for the simultaneous and independent transmission of a plurality of command signals includes a transmitting device and a receiving device interconnected by an optical waveguide. The transmitter simultaneously receives a plurality of command signals at parallel inputs and converts the signals to consecutive serial signals which are utilized to modulate a light source that is optically coupled to the optical waveguide. The receiver detects the consecutive serial optical signals and generates corresponding electrical signals which are thereafter converted to simultaneous parallel output signals that may be used to activate command functions. The unique use of an optical waveguide provides for dielectric isolation between the transmitter and receiver so that an operator may be electrically isolated from potentially dangerous high voltage equipment. The system is particularly useful in areas subjected to electromagnetic interference where radio-type controls or hard-wired metallic conductors would be adversely affected by strong electromagnetic interference.

49 Claims, 2 Drawing Figures

MULTICHANNEL FIBER OPTIC CONTROL SYSTEM

BACKGROUND OF THE INVENTION

1. Field of the Invention

The present invention relates to fiber optic control systems and, more particularly, to a system that is adapted to transmit signals of a slow digital nature.

2. Description of the Prior Art

There are many control systems where it is important that the transmitting and receiving portions be electrically isolated from each other to protect operators from the danger presented by high voltage equipment. A radio control system could be used in such situations except for the fact that most high voltage equipment usually emits high levels of electromagnetic radiation which would severely interfere with radio communications. Even in the absence of dangerous voltages, both radio and hard-wired control systems are subject to interference by electromagnetic radiation.

The use of optical fibers in such control systems presents a unique solution to these problems since the optical fibers are made of dielectric material that provide electrical isolation between the transmitter and receiving sections. The optical fiber is also unique in that it is not susceptible to electromagnetic radiation and does not pick up interference that would normally be picked up by wires. Thus, when optical fibers are used in sensitive control systems, spurious signals will not result from electromagnetic radiation.

In the prior art, a number of techniques have been utilized in an attempt to transmit several control signals over a single optical fiber in order to reduce the cost of the control link. The most common approach used was to use tone or frequency signaling to differentiate between the various command signals. This technique resulted in extremely high cost systems since it had the inherent disadvantage of requiring accurate alignment of transmit and receive tone frequencies and required accurate frequency calibration. Thus, the systems of the prior art were extremely complex and expensive and therefore made them impractical for many types of applications.

SUMMARY OF THE INVENTION

The present invention contemplates a multichannel fiber optic control system wherein a transmitter and receiver are interconnected by an optical waveguide which uniquely provides electrical isolation between the transmitter and receiver and is not susceptible to interference from electromagnetic radiation. The transmitter includes means for simultaneously receiving a plurality of independent command signals on parallel inputs and for converting the simultaneous signals to consecutive signals that are utilized to modulate the light output of a light-emitting diode which is optically coupled to an optical waveguide. The receiver detects the consecutive optical signals and converts the optical signals to electrical signals which are thereafter converted to a plurality of simultaneous parallel command signals which may be used to actuate the desired command functions.

The system is intended to transmit signals of a slow digital nature, which signals may be used to operate relays, solid state switches or indicators at the receiving end.

The system includes a logic circuit that can detect errors and disable the output in the event of such errors.

The primary objective of the present invention is to provide a low-cost multichannel optical fiber control system.

Another objective of the present invention is to provide a multichannel control system wherein the transmitting and receiving portions are electrically isolated from each other.

Another objective of the present invention is to provide a multichannel control system that is not susceptible to interference from electromagnetic radiation.

Other objectives and advantages of the present invention will become apparent from the drawings and the description of the invention which follows.

DESCRIPTION OF THE PREFERRED EMBODIMENT

Figure 1:
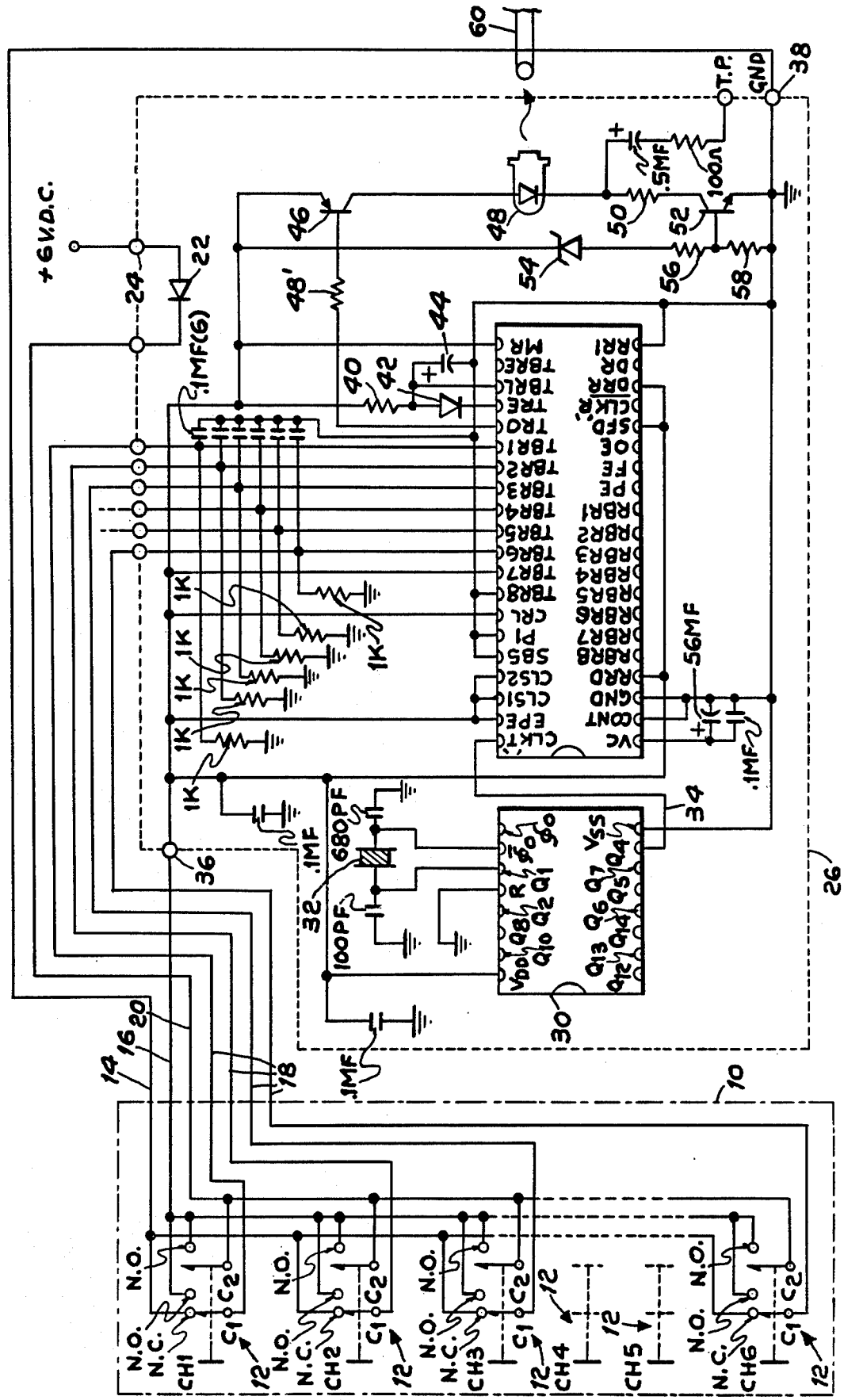
FIG. 1 is a schematic diagram of a transmitter constructed in accordance with the present invention.

Referring to FIG. 1, there is shown an optical transmitter capable of transmitting six independent command signals. For simplicity, the input to the transmitter is shown as a switch box 10 having mounted therein a plurality of double-pole double-throw push-button switches 12. Each of the switches 12 includes a first normally closed contact, N.C., connected to a ground line 14 and two normally open, N.O., contacts connected to a line 16 for providing a positive d.c. voltage out of the switch box 10. Each switch 12 has a common contact $C_1$ which is connected to its own control signal line 18. Each switch 12 has a common contact $C_2$ connected to a line 20 having a positive d.c. voltage impressed thereon, said voltage being approximately 5.4 volts d.c. Thus, upon activation of any one of the switches 12, line 16 will receive a positive d.c. voltage and the corresponding control signal line 18 will also receive a positive d.c. voltage. Line 20 is connected to the cathode of a diode 22 which has an anode connected to a terminal 24 for connection to a source of d.c. voltage having a nominal voltage of +6 volts d.c. Preferably, a battery is used as the power source so that an electrical connection is not needed to provide power to the transmitter.

The transmitter includes a transmitter module 26 having mounted therein a large scale integrated circuit 28 which is commonly known in the industry as a UART or a Universal Asynchronous Receiver/Transmitter. The UART may be selected from a number of commercially available devices, such as a Model 6402 sold by Intersil or Harris. UART's are commonly used in data-handling systems associated with digital computers, and the primary purpose of such devices is that of converting parallel data words into a serial format for transmission over a single transmission line. The UART must be driven by an oscillator and clock divider 30 which may be a Model CD4060A Oscillator and Clock Divider solid by RCA. More recently developed UART's are not manufactured with their own oscillator and clock divider and such a device may easily be used in the present invention, thereby eliminating the need for the separate oscillator and clock divider 30. An example of such a device is a Model 6403 UART manufactured by Intersil or Harris.

The oscillator and clock divider 30 serves only to generate a clock signal for UART 28, and the timing is based on the frequency of a standard ceramic resonator 32 connected to the $\phi_I$ and $\overline{\phi}_o$ pins of the clock divider 30. The ceramic resonator may be a Vernitron Model TF01 resonator which provides a frequency of 455 KHz. Ceramic resonators are particularly suitable for such applications since they are extremely stable over the desired temperature range required for operation of the control system and are rather inexpensive. The 455 KHz signal is divided down to approximately 28.4 KHz to provide the clock signal to the UART. Said clock signal is transmitted by line 34 which is connected between pin $Q_4$ of clock divider 30 and the CLK'T' pin on the UART 28. Pin R and pin VSS of the clock divider 30 are both connected to ground, while pin VDD is connected to a terminal 36 of module 26, which contact is connected to line 16 from the switch box 10 for receiving the positive d.c. voltage therefrom. A 0.1 microfarad capacitor is connected between pin VDD of clock divider 30 and ground for elimination of noise and in like manner, pin $\phi_I$ is connected to ground through a 100 picofarad capacitor and pin $\overline{\phi}_o$ is connected to ground through a 680 picofarad capacitor.

Only the transmit section of UART 28 is used and therefore many pins are left unconnected. Terminal 36 is connected to the following pins of UART 28; EPE, CLS1, CLS2, CRL, TBR7, MR, VC, RRD, SFD, and $\overline{DRR}$ for providing a positive d.c. voltage thereto whenever a switch 12 is closed. Pins EPE, CLS1, and CLS2 are also connected to ground through a 0.1 microfarad capacitor. A ground terminal 38 of module 26 is connected to the following pins of UART 28: GND, CONT, RB1, TBR8, PI and SBS. A parallel connection of a 56 microfarad capacitor and a 0.1 microfarad capacitor are connected between pins VC and GND of UART 28. Terminal 28 of module 26 is also connected to pin TBRL of UART 28 through a 2.2 K resistor 40, and pin TRE is connected to the cathode of a diode 42 which has its anode connected to pin TBRL. Pin TBRL is also connected to ground through a 10 microfarad capacitor 44.

Pins TBR1 through TBR6 of UART 28 are each connected to one of the lines 18 connected to the common terminals Cl to switches 12 for receiving a command signal. Pins TRB1 through TBR6 are each connected to ground through parallel connections of a 1K resistor and a 0.1 microfarad capacitor for shorting any possible pick-up from the input signals to ground.

A transistor 46, such as a G.E. Model D29F1, has an emitter connected to terminal 36 for receiving a positive d.c. voltage and a base connected to the output pin TRO of UART 28 through a 1K resistor 48'. The collector of transistor 46 is connected to the anode of a light-emitting diode 48 such as a Monsanto ME7140. The cathode of the light-emitting diode 48 is connected to ground through a 68 ohm resistor 50 and a transistor 52. The base of transistor 52 is connected to a voltage divider comprising a serial connection of a 1N5227 zener diode 54, a 470 ohm resistor 56 and a 1.5K resistor 58, which series combination is connected between terminal 36 and ground. The purpose of the zener diode 54 is to provide a low voltage cut-off so that transistor 52 will not conduct if the battery voltage drops to a level that could cause manfunctioning of the UART 28 and an erroneous signal. A test point terminal T.P. is provided in module 26 and is connected to the cathode of the light-emitting diode 48 through a series connection of a 0.5 microfarad capacitor and a 100 ohm resistor.

The light-emitting diode 48 is optically coupled to an optical waveguide 60 over which the command signals may be optically transmitted. Waveguide 60 could be a single optical fiber or a bundle of fibers for transmitting the light.

The embodiment shown in FIG. 1 is designed to transmit six control signals; however, it is to be understood that a maximum of eight signals can be transmitted. In the embodiment shown in FIG. 1, a safety feature is incorporated by uniquely connecting inputs TBR7 and TBR8 to a positive d.c. signal and ground respectively to thereby transmit one and a zero level logic signals as signal seven and eight. The receiver monitors these bits of the transmitted word prior to activating the other outputs and thereby prevents false activation of the receiver in a potentially hazardous environment. Thus, this feature provides a margin of safety that may or may not be necessary depending upon the environment in which the control system is to be used.

The RC circuit formed by components 40 and 44, in conjunction with diode 42, cause the internal input buffer latch of the UART 28 to be reloaded every time the last word has been completely shifted out. When the transmit register of the UART is empty, the output on pin TRE goes high, thereby allowing capacitor 44 to charge through resistor 40 and after a predetermined delay, the voltage on capacitor 44 will be sufficient to provide a one level signal to pin TBRL which, in response thereto, causes data on the inputs TBR1 through TBR8 to load into the buffer register, which data then loads into the transmit register which, in response thereto, causes the signal on pin TRE to go low thereby preventing any further data from entering the buffer register until the transmit register is again emptied and the output on pin TRE goes high.

It is to be noted that UART 28 receives power through terminal 36 only when at least one of the switches 12 is closed, thereby assuring that the transmitter will not use power until a channel is activated. Thus, the transmitter is ideally suited for battery operation which is required to electrically isolate the transmitter from a power source. If it were required to connect the transmitter to a source of power, the electrical isolation feature of the device would no longer exist and its primary advantage would be eliminated.

The serial data words generated by UART 28 are packets of bits consisting of a start bit, two fixed bits, the six command data bits, a parity bit and two stop bits. The bits are serially provided at pin TRO of UART 28, which is connected to the base of transistor 46 through resistor 48 for modulating the signal passed through transistor 46. The signal passing through transistor 46 modulates the LED 48 so that a light signal corresponding to the serial data provided by the UART is produced and coupled to the optical waveguide 60.

Figure 2:
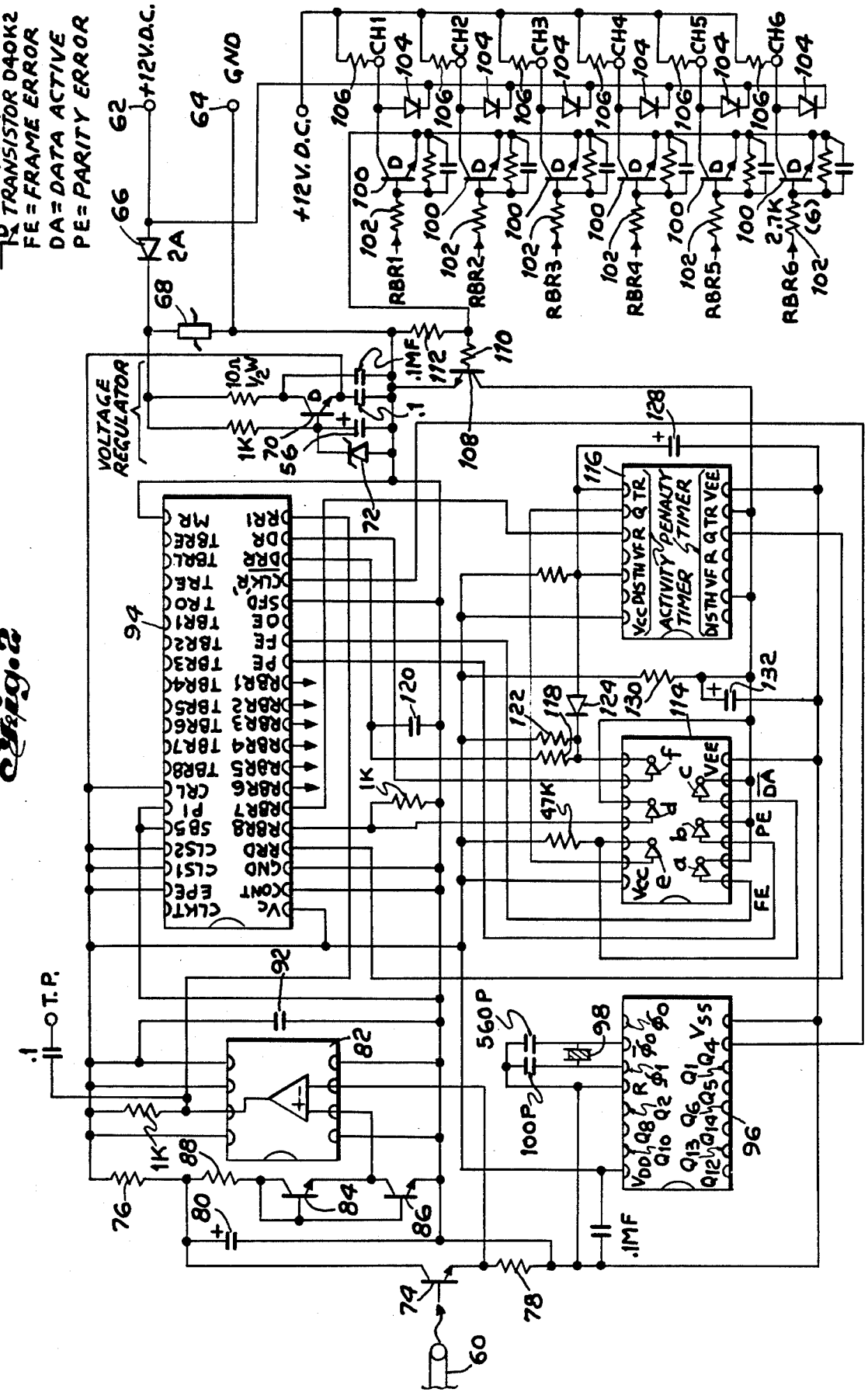
FIG. 2 is a schematic diagram of a receiver constructed in accordance with the present invention.

Referring to FIG. 2, there is shown a receiver for the control system which is adapted to be connected to a 12 volt d.c. power supply and includes its own voltage regulator section. Terminals 62 and 64 are connected respectively to a +12 volt d.c. supply and to ground. A two amp diode 66 is connected in series with the 12-volt power supply having its anode connected to terminal 62 for the purpose of protecting the receiver from incorrect application of the d.c. power supply polarity. A varistor 68 is connected between the cathode of diode 66 and ground terminal 64 to provide input spike protection so that high-voltage transients may not damage the receiver. The varistor may be a General Electric Model V24ZA4 type of varistor. The voltage regulator portion of the power supply includes a Darlington-type D40K2 transistor 70 having a 6.2 volt zener diode 72 connected between its base and ground with the cathode of the zener diode 72 connected to the base of the Darlington transistor. The base and collector terminals of transistor 70 are connected to the cathode of diode 66 through 1K and 10 ohm resistors respectively, while the base of transistor 70 is also connected to ground through a 56 microfarad capacitor. The emitter and collector terminals of transistor 70 are each connected to ground through 0.1 microfarad capacitors. The output of the voltage regulator is taken from the emitter terminal of the Darlington transistor 70 and provides a nominal +5.4 volt d.c. supply to the receiver.

The optical waveguide 60 is optically coupled to a phototransistor 74 which may be a Monsanto type MT1 phototransistor. The phototransistor has a collector connected to the 5.4 volt d.c. power supply through a 470 ohm resistor 76, and the emitter is connected to ground through a 27K resistor 78. The collector of transistor 74 is also connected to ground through a 47 microfarad capacitor 80. The emitter of transistor 74, which provides the electrical output therefrom, is connected to an inverting input of a comparator 82 which may be a National Semiconductor type LM311 comparator. The comparator 82 also receives a reference voltage at a non-inverting input, which reference voltage is generated by transistors 84 and 86 which may be 2N5172 type transistors. The bases of both transistors 84 and 86 are connected to the collector of transistor 84, which is connected to the collector of phototransistor 74 through a 39K resistor 88. The emitter of transistor 86 is connected to ground and the emitter of transistor 84 is connected to the collector of transistor 86 to provide the reference voltage output to the non-inverting input of the comparator 82. The output of comparator 82 is connected to the 5.4 volt d.c. power source through a 1K resistor 90. The output is also connected to a test point terminal T.P. through a 0.1 microfarad capacitor. A 0.1 microfarad capacitor 92 is also connected between the 5.4 volt d.c. power source and ground to eliminate noise. The output of comparator 82 is essentially amplitude restored in that it is either at a zero level or at a predetermined level. Whenever the signal at the inverting input exceeds the reference level at the non-inverting input, the output goes to the predetermined level. The amplitude restored output of the comparator 82 is connected to an RRI pin of a UART 94 which is similar to the UART 28 shown in FIG. 1. UART 94 shown in FIG. 2 may be an Intersil or Harris Model 6402 which requires a separate oscillator and clock divider or it may be a Model 6403 sold both by Intersil and Harris which includes its own internal clock divider.

Since UART 94 is a Model 6402 without an internal clock, an oscillator and clock divider 96 is provided. Clock divider 96 may be similar to RCA Model CD4060A which operates in a manner identical to the clock divider 30 shown in FIG. 1. A ceramic resonator 98 is connected between pins $\phi_I$ and $\overline{\phi}_o$. The ceramic resonator may be a Vernitron type TF01 ceramic resonator which produces a frequency of 455 KHz. Pin $\overline{\phi}_I$ is also connected to ground through a 100 picofarad capacitor, while pin $100_o$ is connected to ground through a 560 picofarad capacitor. Pins R and $V_{ss}$ are each connected to ground. Pin VDD is connected to the 5.4 volt d.c. power source and to ground through a 0.1 microfarad capacitor. Clock divider 96 provides a signal at output $Q_4$ having a frequency of approximately 28.4 KHz, which signal is connected to a pin CLK'R' of the UART 94.

The following pins of UART 94 are connected to the 5.4 volt d.c. power source: CRL, CLS2, CLS1, EPE, and VC. The following pins of UART 94 are connected to ground: MR, PI, SBS, CONT, GND and SFD. Each of the outputs RBR1 through RBR6 of UART 94 is connected to the base of a Darlington transistor 100 through a 2.7K resistor 102. The Darlington transistors may be type D40K2 sold by General Electric. Connected between the base and emitter of each Darlington transistor 100 is a parallel connection of a 10K resistor and a 0.1 microfarad capacitor. The collector of each Darlington transistor 100 is connected to an anode of a diode 104 that has a cathode connected to the terminal 62. The collectors of the Darlington transistors 100 are also connected to terminals CH1 through CH6 to provide output control signals. In the embodiment shown in FIG. 2, terminals CH1 through CH6 are connected to relay coils 106 which are also connected to the 12 volt d.c. power source. It is to be understood that outputs CH1 through CH6 may be connected to other types of output devices other than relays, such as solid state switches, indicating pilot lights or other devices for providing a control function.

The emitters of each of the transistors 100 are connected to the base of a transistor 108 through a 100 ohm resistor 110 and to ground through a 0.6 ohm resistor 112. The emitter of transistor 108 is connected to ground, and the collector is connected to a logic network, the purpose of which will be described subsequently.

The receiver also includes logic circuitry that serves to prevent passage of any output control signals if imperfect data is detected. The circuitry insures that proper data has stabilized prior to allowing the Darlington transistors 100 to activate the relays 106. The logic circuitry utilized for this function includes a hex inverter 114 which may be a Model 7405 hex inverter manufactured by Motorola, Texas Instruments or ITT. The receiver also utilizes a dual timer device 116 which may be similar to a Model NE556 dual timer manufactured by Signetics. The VCC and VEE contacts of each of the circuits 114 and 116 are connected to the 5.4 volt d.c. supply and ground respectively for providing power to the circuits.

The hex inverter 114 is an open collector type inverter so that if a group of inverter outputs are connected together, the common output will remain at a zero state until the inputs of each inverter are receiving a zero level signal, at which time the common output will go to the one level. Hex inverter 114 has six inverters designated a to f. The outputs of inverters a, b, c, and d of the hex inverter 114 are connected together and are further connected to the TH and TR inputs of a penalty timer portion of the dual timer 116 and to the collector of transistor 108. The input of inverter a of hex inverter 114 is connected to the FE contact of UART 94, while the input of inverter b is connected to the PE output of UART 94. The input of inverter c is connected to the output of an inverter e of hex inverter 114 and also to the +5.4 volt d.c. source through a 4.7K resistor. The input of inverter d is connected to the terminal RBR8 of UART 94 and to ground through a 1K resistor.

The purpose of the 4.7K resistor connected to the output of inverter e is to pull the output to a one-level if the output of inverter e is not maintained at a zero level by the constant pressure of a one-level input. The 1K resistor connected between ground and the RBR8 output of the UART 94 is for the purpose of pulling down the output to make it look like a zero level signal when the outputs RBR1 through RBR8 are in the tri-state mode or floating.

The inverter f of the hex inverter 114 has an input connected to the DR terminal of UART 94 and an output connected to the $\overline{DRR}$ terminal of UART 94 through a 10K resistor 118 and through a 0.1 MFD capacitor 120 to ground. The input of inverter f of 114. The output of inverter f is connected to the 30 5.4 volt d.c. source through a 1K resistor 122. The DR output of the UART 94 provides a one-level signal when a word has been completely received into the UART registers. Normally, the DR output will be at a zero level causing the output of the inverter f to be pulled to a one-level through resistor 122 which is connected to the positive d.c. source. The one-level at the output of inverter f causes capacitor 120 to charge so $\overline{DRR}$ sees a one level. When a word has been completely received into UART 94, the DR output will go high presenting a one-level signal to the input of inverter f causing the output to go to zero and the capacitor 120 to discharge through the resistor 118. After a predetermined time delay, capacitor 120 will discharge sufficiently to provide a signal to input $\overline{DRR}$, which signal will cause the output DR to again revert to the zero level state so that the output of inverter f goes high. Thus, the output of inverter f will go to zero for a predetermined period of time each time a word is received into the UART 94.

The activity timer portion of the dual timer 116 has inputs TH and TR connected to the output of inverter f of hex inverter 114 through a diode 124. The inputs are further connected to the positive d.c. source through a resistor 126. Inputs TH and TR of the activity timer are also connected to ground through a 10 microfarad capacitor 128. The capacitor 128 is normally charged through resistor 126; however, the capacitor is periodically discharged through diode 124 to the zero level output of inverter f so that the voltage on capacitor 128 normally does not exceed a specified level if words are regularly received into UART 94. In the event that words are not regularly received into UART 94 and the DR output does not provide a one-level signal, the capacitor 128 will be allowed to charge fully, which will provide a one-level signal to inputs TH and TR of the activity timer, which will cause its output Q to revert to a zero level state. The existence of a zero level signal at output Q of the activity timer will cause the output of inverter e to be pulled to a one-level signal which is provided to the input of inverter c, which will cause the common output of inverters a, b, c and d to go to a zero level. However, so long as a steady stream of words is received into the UART 94, output Q of the activity timer will remain at a one-level since the capacitor 128 will not be allowed to charge sufficiently to provide a one-level signal to inputs TH or TR of the activity timer. Input R of the activity timer is connected to output RBR7 of UART 94 which, when operating properly, provides a one-level output so that the timer is not reset. In the event that the output RBR7 of UART 94 reverts to a zero level, the activity timer is reset and output Q reverts to zero. When output RBR7 of UART 94 is in the tri-state mode or is floating, the input R of the activity timer is not pulled down to a zero level but will inherently remain at the one level. Thus, a constant stream of words must be received by UART 94 so that the output of inverter c remains at a one-level signal at the common output of inverters a, b, c and d.

Thus, inverter a monitors a framing error signal at output FE, inverter b monitors a parity error signal at output PE, inverter c, in conjunction with inverters e and f and the activity timer, monitor the constant reception of words and also by way of input R of the activity timer and output RBR7, the proper reception of test bit 7, and inverter d monitors the proper reception of test bit 8 on RBR8. If an error is detected at any one of these points, the common inverter output connector will go to zero indicating an error.

The common output of inverters a, b, c and d is connected to the positive d.c. voltage source through a 10K resistor 130 and to ground through a 10 mirofarad capacitor 132. When the inputs of inverters a, b, c and d are zero, the outputs may go to a one-level logic signal and capacitor 132 is allowed to charge through resistor 130 and a one-level signal is applied to inputs TH and TR of the penalty timer and to the collector of transistor 108. The presence of a one-level signal at inputs TH and TR of the penalty timer causes its output Q to go to a zero level.

Output Q of the penalty timer is connected to the RRD input of UART 94 which disables RBR1 through 8 when a one-level signal is received. If no error is detected, a zero level signal is provided to input RRD and the UART operates normally. In the event an error is detected and the common output of inverters a, b, c and d reverts to a zero level, the output Q of the penalty timer will immediately go to a one-level, which appears at the RRD input of UART 94 and causes the outputs RBR1 through RBR8 to be disabled and enter a floating or tri-state mode. Thus, outputs RBR1 through RBR8 are in a floating condition if any of the following events occur: a zero level at the parity error output PE, a zero level at the framing error output FE, an interruption of the flow of words into the UART, the presence of a one-level signal at output RBR8 or the presence of a zero level signal at output RBR7. When the data errors disappear, the outputs of the inverters may again go to the one-level; however, a time delay will be experienced due to the RC time constant of resistor 130 and capacitor 132, thereby delaying the reversion of output Q of the penalty timer to a zero level for a predetermined delay to assure proper stabilization of the data. After capacitor 132 has properly charged to the one-level, the output Q of the penalty timer will revert to the zero level and data may again flow through the receiver. Thus, the penalty timer provides a delay and prevents enabling the UART as a result of a temperary cessation of errors and thereby assures proper data stabilization before the UART is again enabled.

It is to be noted that while the outputs RBR1 to 6 to the UART 94 are in the tri-state, they are pulled to a zero level by the connection to ground through resistors 102, the base-to-emiter resistor of the Darlington transistors 100 and resistor 112 to thereby assure that the transistors 100 will not be inadvertently activated.

Thus, the present invention provides a unique multi-channel control system that provides electrical isolation between the transmitter and receiver portions, is less susceptible to interference from electromagnetic radiation and provides safety logic to prevent the inadvertent activation of output functions that could result from possible malfunctioning of the system. The multichannel fiber optic control system provides an inexpensive and effective multichannel control system for use in environments where high electromagnetic radiation may cause interference and where electrical isolation between the transmitting and receiving portions is desired.

The invention has been successfully used to control the boom of a "cherry picker" used by utility companies for easy access to overhead electrical wires. In such devices, it is important that the operator at the end of the boom be totally isolated from ground in the event he comes in contact with the high voltage wires or equipment. The "bucket" is insulated from the boom and the present invention allows the battery powered transmitter to also be electrically isolated, thereby providing complete protection for the operator in the "bucket".

What is claimed is:

1. A multichannel fiber optic transmission system, comprising:
   first UART circuit means for receiving a plurality of signals on separate input terminals and for providing said signals consecutively at a single output terminal, said circuit means including:
      a transmit register empty (TRE) output which provides a one-level signal when the transmit register of the UART is empty;
      a transmit buffer register load input (TBRL) which causes an input buffer register to load upon receipt of a one-level signal; and
      an RC delay circuit that charges when the transmit register empty output provides a one-level signal and after a predetermined time delay provides a one-level signal to the transmit buffer register load input, whereby the transmit buffer register will load a predetermined time after the transmit register is emptied;
   second means connected to said output terminal and responsive to the consecutive signals received therefrom for providing consecutive light signals corresponding to said consecutive signals;
   optical waveguide means coupled to said light output means for conducting said consecutive light signals;
   third means for receiving said light signals and in response thereto for providing consecutive electrical signals corresponding to the light signals; and
   fourth means for receiving said consecutive electrical signals and in response thereto providing said signals simultaneously and separately at a plurality of output terminals whereby the first and second means are electrically isolated from the third and fourth means and the system is substantially unaffected by electromagnetic radiation due to the inherent dielectric characteristics of the optical waveguide means.

2. A system as described in claim 1, wherein the optical waveguide means comprises an optical fiber.

3. A system as described in claim 1, wherein the optical waveguide means comprises a bundle of optical fibers.

4. A system as described in claim 1, additionally comprising means for producing a plurality of signals and for providing said signals to the first means.

5. A system as described in claim 1, additionally comprising means for receiving each of the signals at the output terminals, said means being activated by said signals.

6. A system as described in claim 5, wherein the means for receiving the signals comprises switch means.

7. A system as described in claim 5, wherein the means for receiving the signals comprises relay means.

8. A system as described in claim 1, wherein the second means comprises a light-emitting diode.

9. A system as described in claim 1, wherein the third means comprises a phototransistor.

10. A system as described in claim 1, wherein the second means includes means for sensing a power source voltage level and for inhibiting the light signals when the voltage level drops below a predetermined level.

11. A system as described in claim 1, additionally comprising clock means for providing a clock signal to the UART.

12. A system as described in claim 11, additionally comprising a ceramic resonator associated with said clock means for establishing a clock frequency.

13. A system as described in claim 1, wherein the fourth means generates error signals in the event of certain signal errors and the system additionally comprises logic means responsive to the error signals to provide a disable signal to the fourth means which, in response thereto, is disabled whereby improper signal flow is prevented.

14. A system as described in claim 1 additionally comprising a battery for providing power to the first and second means.

15. A multichannel fiber optic transmission system, comprising:
   first UART circuit means for receiving a plurality of signals on separate input terminals and for providing said signals consecutively at a single output terminal;
   second means connected to said output terminal and responsive to the consecutive signals received therefrom for providing consecutive light signals corresponding to said consecutive signals;
   optical waveguide means coupled to said light output means for conducting said consecutive light signals;
   third means for receiving said light signals and in response thereto for providing consecutive electrical signals corresponding to the light signals;
   fourth means for receiving said consecutive electrical signals and in response thereto providng said signals simultaneously and separately at a plurality of output terminals whereby the first and second means are electrically isolated from the third and fourth means and the system is substantially unaffected by electromagnetic radiation due to the inherent dielectric characteristics of the optical waveguide means, said fourth means also generating error signals in the event of certain signal errors; and
   logic means responsive to the error signals to provide a disable signal to the fourth means which, in response thereto, is disabled, said logic means including an activity timer means for providing the disable signal in the event that a continuous flow of signals is not received by the fourth means, whereby improper signal flow is prevented.

16. A multichannel fiber optic transmission system, comprising:

first UART circuit means for receiving a plurality of signals on separate input terminals and for providing said signals consecutively at a single output terminal;

second means connected to said output terminal and responsive to the consecutive signals received therefrom for providing consecutive light signals corresponding to said consecutive signals;

optical waveguide means coupled to said light output means for conducting said consecutive light signals;

third means for receiving said light signals and in response thereto for providing consecutive electrical signals corresponding to the light signals;

fourth means for receiving said consecutive electrical signals and in response thereto providing said signals simultaneously and separately at a plurality of output terminals whereby the first and second means are electrically isolated from the third and fourth means and the system is substantially unaffected by electromagnetic radiation due to the inherent dielectric characteristics of the optical waveguide means, said fourth means also generating error signals in the event of certain signal errors; and logic means responsive to the error signals to provide a disable signal to the fourth means which, in response thereto, is disabled, said logic means includes a penalty timer means that sustains the disable signal for a predetermined time after the cessation of all error signals, so that improper signal flow is prevented.

17. A multichannel fiber optic transmission system, comprising:

first means including UART circuit means for receiving a plurality of signals on separate input terminals and for providing said signals consecutively at a single output terminal;

second means connected to said output terminal and responsive to the consecutive signals received therefrom for providing consecutive light signals corresponding to said consecutive signals;

optical waveguide means coupled to said light output means for conducting said consecutive light signals;

third means for receiving said light signals and in response thereto for providing consecutive electrical signals corresponding to the light signals;

fourth means including UART circuit means for receiving said consecutive electrical signals and in response thereto providing said signals simulanteously and separately at a plurality of output terminals whereby the first and second means are electrically isolated from the third and fourth means and the system is substantially unaffected by electromagnetic radiation due to the inherent dielectric characteristics of the optical waveguide means; and logic means responsive to outputs of the fourth means for providing a disable signal to the means in the event of improper signal flow, said logic means including an activity timer responsive to an interruption in the flow of signals through the fourth means to provide the disable signal.

18. A system as described in claim 17, additionally comprising clock means for providing a clock signal to the UART.

19. A system as described in claim 18, additionally comprising a ceramic resonator associated with said clock means for establishing a clock frequency.

20. A multichannel fiber optic transmission system, comprising:

first means including UART circuit means for receiving a plurality of signals on separate input terminals and for providing said signals consecutively at a single output terminal;

second means connected to said output terminal and responsive to the consecutive signals received therefrom for providing consecutive light signals corresponding to said consecutive signals;

optical waveguide means coupled to said light output means for conducting said consecutive light signals;

third means for receiving said light signals and in response thereto for providing consecutive electrical signals corresponding to the light signals;

fourth means including UART circuit means for receiving said consecutive electrical signals and in response thereto providing said signals simultaneously and separately at a plurality of output terminals whereby the first and second means are electrically isolated from the third and fourth means and the system is substantially unaffected by electromagnetic radiation due to the inherent dielectric characteristics of the optical waveguide means; and logic means responsive to outputs of the fourth means for providing a disable signal to the fourth means in the event of improper signal flow, said logic means including a penalty timer means for sustaining the disable signal for a predetermined time after cessation of an improper signal flow.

21. A multichannel fiber optic transmission system, comprising:

first means including UART circuit means for receiving a plurality of signals on separate input terminals and for providing said signals consecutively at a single output terminal;

second means connected to said output terminal and responsive to the consecutive signals received therefrom for providing consecutive light signals corresponding to said consecutive signals;

optical waveguide means coupled to said light output means for conducting said consecutive light signals;

third means for receiving said light signals and in response thereto for providing consecutive electrical signals corresponding to the light signals;

fourth means including UART circuit means for receiving said consecutive electrical signals and in response thereto providing said signals simultaneously and separately at a plurality of output terminals whereby the first and second means are electrically isolated from the third and fourth means and the system is substantially unaffected by electromagnetic radiation due to the inherent dielectric characteristics of the optical waveguide means; and logic means responsive to outputs of the fourth means for providing a disable signal to the fourth means in the event of improper signal flow, said logic means including a plurality of inverter circuits and a dual timer integrated circuit.

22. A system as described in claim 21, wherein the fourth means includes a parity error output for providing a signal in the event of a parity error, a framing error output for providing a signal in the event of a framing error, and a data ready output for providing a signal when fourth means has received signals, and the logic means is responsive to a signal at either the parity error output or the framing error output or the absence of signals at the data ready output to disable the UART.

23. A multichannel fiber optic transmission system, comprising:
first means including UART circuit means for receiving a plurality of signals on separate input terminals and for providing said signals consecutively at a single output terminal;
second means connected to said output terminal and responsive to the consecutive signals received therefrom for providing consecutive light signals corresponding to said consecutive signals;
optical waveguide means coupled to said light output means for conducting said consecutive light signals;
third means for receiving said light signals and in response thereto for providing consecutive electrical signals corresponding to the light signals; and
fourth means including UART circuit means for receiving said consecutive electrical signals and in response thereto providing said signals simultaneously and separately at a plurality of output termnals whereby the first and second means are electrically isolated from the third and fourth means and the system is substantially unaffected by electromagnetic radiation due to the inherent dielectirc characteristics of the optical waveguide means, said fourth means provides a parity error output in the event of a parity error, a framing error output in the event of a framing error, a data ready output when signals are fully loaded in the fourth means and includes a receive register disable input for disabling a plurality of receive buffer registers upon receipt of a signal, and additionally includes logic means responsive to a parity error output, a frame error output or the absence of a data ready output signal for a predetermined period of time to provide a disable signal to the receive register disable input to disable the fourth means.

24. A system as described in claim 23, additionally comprising means for sustaining the disable signal to the receive register disable input for a predetermined period of time after the logic means ceases to detect an error signal.

25. A system as described in claim 23, wherein the logic means includes an activity timer responsive to the data ready output signals for providing a disable signal in the absence of a data ready output signal for a predetermined period of time, and a penalty timer means responsive to the detection of an error signal for sustaining the disable signal for a predetermined period of time after cessation of all error signals.

26. A transmitter for a multichannel transmission system, comprising:
first UART circuit means for receiving a plurality of signals on separate independent terminals and for providing said signals consecutively at a single output terminal, said UART including:
a transmit register empty (TRE) output which provides a one-level signal when the transmit register of the UART is empty;
a transmit buffer register load input (TBRL) which causes an input buffer register to load upon receipt of a one-level signal; and
an RC delay circuit that charges when the transmit register empty output provides a one-level signal and after a predetermined time delay provides a one-level signal to the transmit buffer register load input, whereby the transmit buffer register will load a predetermined time after the transmit register is emptied; and
second means connected to said output terminal and responsive to the consecutive signals received therefrom for providing consecutive light signals corresponding to said consecutive signals.

27. A system as described in claim 26, additionally comprising means for providing a plurality of signals and for providing said signals to the first means.

28. A system as described in claim 26, wherein the second means comprises a light-emitting diode.

29. A system as described in claim 26 wherein the second means includes means for sensing a power source voltage level and for inhibiting the light signals when the voltage level drops below a predetermined level.

30. A system as described in claim 26, additionally comprising clock means for providing a clock signal to the UART.

31. A system as described in claim 30, additionally comprising a ceramic resonator associated with said clock means for establishing a clock frequency.

32. A system as described in claim 26, additionally comprising a battery for providing power to the first and second means.

33. A receiver for use in a system of the type that transmits consecutive light signals of a slow digital nature over a single optical waveguide, comprising:
first means for receiving said light signals and in response thereto for providing consecutive electrical signals corresponding to the light signals;
UART circuit means for receiving said consecutive electrical signals and in response thereto providing said signals simultaneously and separately at a pluraltiy of output terminals, said UART circuit means generates error signals in the event of certain signal errors; and
logic means responsive to the error signals to provide a disable signal to the UART circuit means which, in response thereto, is disabled, said logic means including an activity timer means for providing the disable signal in the event that a continuous flow of signals is not received by the UART circuit means, so that improper signal flow is prevented.

34. A system as described in claim 33, additionally comprising means for receiving each of the signals at the output terminals, said means being activated by said signals.

35. A system as described in claim 33, wherein the means for receiving the signals comprises switch means.

36. A system as described in claim 33, wherein the means for receiving the signals comprises relay means.

37. A system as described in claim 33, wherein the first means comprises a phototransistor.

38. A system as described in claim 33 wherein the UART circuit means generates error signals in the event of certain signal errors and the system additionally comprises logic means responsive to the error signals to provide a disable signal to the UART circuit means which, in response thereto, is disabled whereby improper signal flow is prevented.

39. A system as described in claim 33, additionally comprising clock means for providing a clock signal to the UART.

40. A system as described in claim 39, additionally comprising a ceramic resonator associated with said clock means for establishing a clock frequency.

41. A multichannel fiber optic transmission system, comprising
   first UART circuit means for receiving a plurality of signals on separate input terminals and for providing said signals consecutively at a single output terminal;
   second means connected to said output terminal and responsive to the consecutive signals received therefrom for providing consecutive light signals corresponding to said consecutive signals;
   optical waveguide means coupled to said light output means for conducting said consecutive light signals;
   third means for receiving said light signals and in response thereto for providing consecutive electrical signals corresponding to the light signals;
   fourth means for receiving said consecutive electrical signals and in response thereto providing said signals simultaneously and separately at a plurality of output terminals and for generating error signals in the event of certain signal errors;
   logic means responsive to the error signals to provide a disable signal to the fourth means which, in response thereto, is disabled to prevent improper signal flow; and
   penalty timer means for sustaining the disable signal for a predetermined time after cessation of all error signals, whereby the first and second means are electrically isolated from the third and fourth means and the system is substantially unaffected by electromagnetic radiation due to the inherent dielectric characteristics of the optical waveguide means and the system is disabled in response to the occurrence of certain signal errors and remains disabled for a predetermined time after cessation of the error signals.

42. A receiver for use in a system of the type that transmits consecutive light signals of a slow digital nature over a single optical waveguide, comprising:
   first means for receiving said light signals and in response thereto for providing consecutive electrical signals corresponding to the light signals;
   second means for receiving said consecutive electrical signals and in response thereto providing said signals simultaneously and separately at a plurality of output terminals and for generating error signals in the event of certain signal errors;
   logic means responsive to the error signals to provide a disable signal to the second means which, in response thereto, is disabled; and
   penalty timer means for sustaining the disable signal for a predetermined time after the cessation of all error signals, whereby improper signal flow is prevented during the presence of certain signal errors and for a predetermined time after the cessation of said signal errors.

43. A receiver for use in a system of the type that transmits consecutive light signals of a slow digital nature over a single optical waveguide, comprising:
   first means for receiving said light signals and in response thereto for providing consecutive electrical signals corresponding to the light signals;
   UART circuit means for receiving said consecutive electrical signals and in response thereto providing said signals simultaneously and separately at a plurality of output terminals, said UART circuit means generates error signals in the event of certain signal errors; and
   logic means responsive to the error signals to provide a disable signal to the UART circuit means which, in response thereto, is disabled, said logic means includes a penalty timer means that sustains the disable signal for a predetermined time after cessation of all error signals, so that improper signal flow is prevented.

44. A receiver for use in a system of the type that transmits consecutive light signals of a slow digital nature over a single optical waveguide, comprising:
   first means for receiving said light signals and in response thereto for providing consecutive electrical signals corresponding to the light signals;
   UART circuit means for receiving said consecutive electrical signals and in response thereto providing said signals simultaneously and separately at a plurality of output terminals;
   clock means for providing a clock signal to the UART circuit means; and
   logic means responsive to outputs of the UART circuit means for providing a disable signal to the UART circuit means in the event of improper signal flow, said logic means including an activity timer responsive to an interruption in the flow of signals through the UART to provide the disable signal.

45. A receiver for use in a system of the type that transmits consecutive light signals of a slow digital nature over a single optical waveguide, comprising:
   first means for receiving said light signals and in response thereto for providing consecutive electrical signals corresponding to the light signals;
   UART circuit means for receiving said consecutive electrical signals and in response thereto providing said signals simultaneously and separately at a plurality of output terminals;
   clock means for providing a clock signal to the UART circuit means; and
   logic means responsive to outputs of the UART circuit means for providing a disable signal to the UART circuit means in the event of improper signal flow, said logic means including a penalty timer means for sustaining the disable signal for a predetermined time after cessation of an improper signal flow.

46. A receiver for use in a system of the type that transmits consecutive light signals of a slow digital nature over a single optical waveguide, comprising:
   first means for receiving said light signals and in response thereto for providing consecutive electrical signals corresponding to the light signals;
   UART circuit means for receiving said consecutive electrical signals and in response thereto providing said signals simultaneously and separately at a plurality of output terminals;
   clock means for providing a clock signal to the UART circuit means; and
   logic means responsive to outputs of the UART circuit means for providing a disable signal to the UART circuit means in the event of improper signal flow, said logic means includes a plurality of inverter circuits and a dual timer integrated circuit.

47. A receiver for use in a system of the type that transmits consecutive light signals of a slow digital nature over a single optical waveguide, comprising:

first means for receiving said light signals and in response thereto for providing consecutive electrical signals corresponding to the light signals;

UART circuit means for receiving said consecutive electrical signals and in response thereto providing said signals simultaneously and separately at a plurality of output terminals, said UART circuit means includes a parity error output for providing a signal in the event of a parity error, a framing error output for providing a signal in the event of a framing error, and a data ready output for providing a signal when the UART circuit means has received signals;

clock means for providing a clock signal to the UART circuit means; and logic means responsive to outputs of the UART circuit means for providing a disable signal to the UART circuit means in the event of improper signal flow, said logic means being responsive to a signal at either the parity error output or the framing error output or the absence of signals at the data ready output to disable the UART circuit means.

48. A receiver for use in a system of the type that transmits consecutive light signals of a slow digital nature over a single optical waveguide, comprising:

first means for receiving said light signals and in response thereto for providing consecutive electrical signals corresponding to the light signals;

UART circuit means for receiving said consecutive electrical signals and in response thereto providing said signals simultaneously and separately at a plurality of output terminals, said UART circuit means also provides a parity error output in the event of a parity error, a framing error output in the event of a framing error, a data ready output when signals are fully loaded in the UART circuit means and further includes a receive register disable input for disabling a plurality of receive buffer registers upon receipt of a signal; and logic means responsive to a parity error output, a frame error output or the absence of a data ready output signal for a predetermined period of time to provide a disable signal to the receive register disable input to disable the UART circuit means.

49. A system as described in claim 48, additionally comprising means for sustaining the disable signal to the receive register disable input for a predetermined period of time after the logic means ceases to detect an error signal.

* * * * *